United States Patent [19]

Freire et al.

[11] Patent Number: 5,100,639

[45] Date of Patent: Mar. 31, 1992

[54] PROCESS FOR PURIFYING HYDROGEN FLUORIDE

[75] Inventors: Francisco J. Freire, Wilmington; Jon L. Howell, Bear, both of Del.; Kaye L. Motz; Craig T. Barker, both of Ponca City, Okla.; William C. Ziegenhain; Eileen G. Edwards, both of Ponca City, Okla.

[73] Assignee: E. I. du Pont de Nemours and Company, Wilmington, Del.

[21] Appl. No.: 659,440

[22] Filed: Feb. 22, 1991

Related U.S. Application Data

[63] Continuation of Ser. No. 487,437, Mar. 2, 1990, abandoned.

[51] Int. Cl.$^5$ .................. C01B 7/19; C02F 1/72; C25B 1/24
[52] U.S. Cl. .................... 423/484; 204/101; 204/128; 204/186; 210/748; 210/758
[58] Field of Search ............... 423/484; 204/101-128, 204/186, 158.2, 130; 203/91; 210/758, 748

[56] References Cited

U.S. PATENT DOCUMENTS

| 2,742,415 | 4/1956 | Lawrence et al. | 204/130 |
| 2,767,136 | 10/1956 | Rodis et al. | 204/130 |
| 4,692,228 | 9/1987 | Taardowski | 204/130 |

FOREIGN PATENT DOCUMENTS 4325135 10/1968 Japan ....................... 423/484

Primary Examiner—John Niebling
Assistant Examiner—Brian M. Bolam
Attorney, Agent, or Firm—Robert B. Stevenson; Michael K. Boyer

[57] ABSTRACT

A process for manufacturing high purity anhydrous hydrogen fluoride (HF) having low levels of oxidizable impurities by electrolytically oxidizing the impurities. Specifically, trivalent arsenic impurity in the anhydrous hydrogen fluoride is oxidized to a non-volatile pentavalent arsenic compound. The resultant mixture is distilled to recover high purity anhydrous hydrogen fluoride with low levels of arsenic impurity.

20 Claims, No Drawings

PROCESS FOR PURIFYING HYDROGEN FLUORIDE

This application is a continuation of application Ser. No. 07/487,437 filed Mar. 2, 1990 now abandoned.

BACKGROUND OF THE INVENTION

1. Field of the Invention

This invention relates to the manufacture of high purity anhydrous hydrogen fluoride with low levels of oxidizable impurities. More specifically but not by way of limitation, this invention deals with a manufacturing process which involves oxidizing the volatile trivalent arsenic impurity to a non-volatile arsenic pentavalent compound using direct current in an electrolytic cell. The resulting mixture is distilled to recover high purity anhydrous hydrogen fluoride with very low levels of arsenic, water and other oxidizable impurities.

2. Description of the Related Art

Anhydrous hydrogen fluoride is formed by heating a mixture of fluorspar and sulfuric acid. The main impurities in the prepared hydrogen fluoride are flurosulfonic acid, silicon tetrafluoride, sulfur dioxide, sulfuric acid and water. These impurities are usually removed by fractional distillation, and the resulting anhydrous hydrogen fluoride has a purity of about 99.8% or better. However, the anhydrous hydrogen fluoride thus obtained still contains unacceptable quantities of undesirable impurities such as arsenic. The amount of arsenic impurity which is present in the anhydrous hydrogen fluoride depends on the amount of arsenic-bearing impurities in the fluorspar used to prepare the anhydrous hydrogen fluoride.

The anhydrous hydrogen fluoride generally contains about 20 to 600 part per million (ppm) of arsenic impurity. The presence of this impurity at these levels is undesirable for many applications. Anhydrous hydrogen fluoride is extensively used as a fluorinating agent in the production of organic and inorganic chemicals, and in the refining of metals. The presence of arsenic impurities in the anhydrous hydrogen fluoride can poison catalysts, contaminate products and cause severe equipment corrosion.

Several processes have been proposed to remove arsenic impurities from anhydrous hydrogen fluoride. Among these are processes which involve multiple fractional distillation. However, such methods are not considered to be economical for producing commercial quantities.

For example, in U.S. Pat. No. 3,687,622 the distillation of impure anhydrous hydrogen fluoride containing 1200 ppm As at very high pressures (e.g., >115 psia and preferably >165 psia) is disclosed wherein the As is removed overhead and purified hydrogen fluoride (e.g., <3,000 ppb and preferably <100 ppb As) is recovered as bottoms product. In U.S. Pat. No. 3,663,382 As impurities are removed from anhydrous hydrogen fluoride by distillation at a pressure below 25 psia with purified hydrogen fluoride being recovered as the overhead product.

Most of the processes disclosed in the art to reduce arsenic levels in anhydrous hydrogen fluoride involve oxidation of trivalent arsenic to pentavalent arsenic thereby to reduce its volatility.

For example, U.S. Pat. No. 3,166,379 discloses a method whereby high purity aqueous hydrogen fluoride is produced by treatment with an oxidizing agent, such as permanganate, persulfate, or chlorate salts together with a halogen, preferably iodine, to convert arsenic impurities to non-volatile compounds. This process is suitable for the purification of aqueous hydrogen fluoride but suffers from the drawback of possible contamination with volatile manganese compounds when anhydrous hydrogen fluoride is distilled from the aqueous solution.

A solution to this problem is claimed in U.S. Pat. No. 3,689,370 which describes a process involving the addition of an inorganic ferrous salt to the anhydrous hydrogen fluoride after the permanganate or dichromate treatment to reduce excess oxidizing agents. However, this process results in a high level of iron contamination.

The iron contamination problem is solved in U.S. Pat. No. 4,032,621 which describes a process involving the addition of a heavy-metal-free reagent, such as hydrogen peroxide, to anhydrous hydrogen fluoride after the permanganate or dichromate treatment to reduce excess oxidizing agent. This process is very sensitive and may not be convenient for continuous operation.

In East German Patent No. 62,309 (June 20, 1968) the removal of arsenic from 80–90% aqueous hydrogen fluoride with 30% hydrogen peroxide ($H_2O_2$) at 40°–60° C. is disclosed. The reference also teaches that arsenic removal from anhydrous hydrogen fluoride can be accomplished by continuously adding anhydrous hydrogen fluoride and hydrogen peroxide solution of suitable concentration to the reactor maintained at 80–90% hydrogen fluoride and 40°–60° C. The reactor contents are distilled and absorbed in water to produce a purified aqueous solution of HF. This process is limited to production of aqueous solutions of HF product and is not suitable for the manufacture of purified anhydrous hydrogen fluoride.

U.S. Pat. No. 4,083,941 claims removal of arsenic and sulfite impurities from anhydrous hydrogen fluoride by the addition of 0.7% $H_2O_2$ and 0.6% methanol at 0°–75° C. or by the addition of at least 2.3% by weight of persulfuric acid ($H_2SO_5$) based on anhydrous hydrogen fluoride. But this procedure has the disadvantage of introducing a foreign material to the process.

U.S. Pat. No. 4,491,570 claims arsenic removal from anhydrous hydrogen fluoride by treating with hydrogen chloride or a fluoride salt, or both, and then separating purified anhydrous hydrogen fluoride by distillation from the non-volatile arsenic compounds. Again, this process has the potential of introducing a foreign material into purified anhydrous hydrogen fluoride.

U.S. Pat. No. 4,668,497 discloses a process involving the addition of fluorine to oxidize impurities present in hydrogen fluoride followed by distillation. This process requires the hydrolysis of remaining fluorine after distillation.

U.S. Pat. No. 4,756,899 claims arsenic removal from anhydrous hydrogen fluoride by treating with hydrogen peroxide in the presence of a catalyst, which is comprised of molybdenum or an inorganic molybdenum compound, and a phosphate compound followed by distillation. Again, this process has the potential of introducing foreign material into the purified anhydrous hydrogen fluoride.

SUMMARY OF THE INVENTION

In accordance with this invention, a process for manufacturing high purity anhydrous hydrogen fluoride with low levels of arsenic impurities is provided which does not introduce foreign material into the final product, and which is adaptable for continuous operation. The process involves passing an effective amount of direct current through the anhydrous hydrogen fluoride containing trivalent arsenic impurities at a temperature and for a period of time sufficient to electrolytically oxidize the volatile, difficult-to-separate trivalent arsenic impurity in the anhydrous hydrogen fluoride to non-volatile pentavalent arsenic compounds. The resulting mixture is then distilled, and high purity anhydrous hydrogen fluoride with reduced levels of arsenic impurities is recovered.

Thus the present invention provides a process for purifying anhydrous hydrogen fluoride comprising the steps of:

a. passing an effective amount of direct current through anhydrous hydrogen fluoride containing trivalent arsenic impurities to oxidize substantially all of said trivalent arsenic to pentavalent arsenic; and b. distilling the resulting mixture, thus isolating and separating a residue enriched in arsenic impurities while simultaneously recovering anhydrous hydrogen fluoride distillate with reduced levels of arsenic impurities.

It is an object of the present invention to provide a cost effective method of purifying anhydrous hydrogen fluoride which does not introduce foreign material into the final product, and which is adaptable for continuous operation. It is a further object of the present invention to provide a method of electrolytically oxidizing volatile trivalent arsenic impurities in anhydrous hydrogen fluoride to a non-volatile pentavalent arsenic compound such that purified anhydrous hydrogen fluoride can be recovered by distillation. Fulfillment of these objects and the presence and fulfillment of other objects will be apparent upon complete reading of the specification and attached claims.

DESCRIPTION OF THE PREFERRED EMBODIMENTS

The method of manufacturing high purity anhydrous hydrogen fluoride according to the present invention involves passing an effective amount of a direct current through liquid-phase anhydrous hydrogen fluoride. In principle, this is accomplished by applying a direct current voltage across a pair or pairs of electrodes immersed in the liquid anhydrous hydrogen fluoride present in an electrolytic cell or the like while simultaneously controlling the voltage. During the electrolysis the volatile trivalent arsenic impurities are electrolytically oxidized to non-volatile pentavalent arsenic compounds. The reaction product (more specifically, the liquid reaction medium) can then be fed to a distillation column or the like (as generally known in the art). The high purity anhydrous hydrogen fluoride containing considerably reduced levels of arsenic impurities can then be withdrawn from the top of the column as the desired product. A waste stream containing high levels of arsenic impurities (non-volatile pentavalent arsenic compounds; e.g., $HAsF_6$) is withdrawn from the bottom of the distillation column. Thus, according to the present invention, substantially all arsenic impurities are removed from the anhydrous hydrogen fluoride without the addition of oxidizing chemicals or catalysts.

For purposes of this invention, the electrolytic reaction that converts the trivalent arsenic to the pentavalent arsenic can be viewed as proceeding according to the following electrochemical reactions:

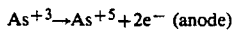

$As^{+3} \rightarrow As^{+5} + 2e^-$ (anode)

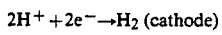

$2H^+ + 2e^- \rightarrow H_2$ (cathode)

Although the possible concomitant production of elemental fluorine at the cathode could be expected at higher voltage drops and certainly will occur at very high voltage drops, it has been found that no significant amount of elemental fluorine (as will be exemplified later) is generated as a result of the present process even at higher voltages and current.

Thus, the electrolysis reaction is carried out at conditions that favor the oxidization of the trivalent arsenic and minimizes the electrolysis of hydrogen fluoride that would result in the formation of undesirable fluorine. However it should be appreciated that under certain circumstances the intentional production of elemental fluorine could be viewed as beneficial. For example, a series of sequential electrolytic cells could be employed wherein impure hydrogen fluoride passing through the sequential series is initially treated with a less than stoichiometric amount of fluorine (relative to the amount of $As^{+3}$ present) rapidly produced at higher voltages such as to oxidize most of the $As^{+3}$ followed by a carefully controlled final electrolytic cell operated at conditions that oxidize the remaining $As^{+3}$ with out substantial production of fluorine. Such a sequential system could, in principle, reliably handle hydrogen fluoride containing high levels of $As^{+3}$ impurities.

According to the present invention, electrical current flow is present at as low as 0.85 volts indicating that desired electrolysis reactions are proceeding. Initially, the rate of reaction and the current increase linearly up to a plateau and then essentially level off with increasing voltage drop up to about 3.25 volts wherein the plot of current as a function of voltage drop increases dramatically in slope. From about 0.85 volts to about 3.25 volts the current efficiency approaches 100 percent indicating that the electrolysis is quantitative and free of side reactions. From about 3.25 volts up to at least 7.5 volts the desired electrolysis reaction will proceed rapidly with substantially no significant production of elemental fluorine, but the current efficiency decreases with increasing voltage drop. Although elemental fluorine may not be detected the presence of side reactions within this voltage range is suspected. Above 9 volts the electrolytic generation of elemental fluorine will be observed with significant fluorine being produced by the electrolysis of hydrogen fluoride above 10 volts. Thus, the useful voltage range for purposes of this invention is from about 0.85 volts to about 9.5 volts, and preferably between about either 0.85 to 3.25 or 3.25 and 7.5 volts. At these voltages substantially all of the $As^{+3}$ is converted to $As^{+5}$ while simultaneously any impurities associated with phosphorous containing compounds, sulfur containing compounds, and/or water are either oxidized to a non-volatile compound or subjected to electrolysis and removed as off-gas at the electrodes. Consequently, the method of removal of arsenic impurities according to the present invention is also useful for simultaneously removing impurities associated with phosphorous containing compounds, sulfur containing compounds, and water.

Preferably, the rate of reaction can be increased (as exemplified later) by increasing the conductance of the hydrogen fluoride by the addition of electrolytes. The electrolytes should be either non-oxidizing electrolytes or electrolytes that produce, upon electrolysis, products that can readily be separated from the desired high purity anhydrous hydrogen fluoride by distillation. This would include, by way of example but not limited thereto; water, potassium fluoride or other alkali metal fluoride and mixtures thereof or the like.

Since the electrolysis step according to the present invention involves passing an effective direct current between electrodes immersed in liquid hydrogen fluoride, the operating conditions must be such that liquid phase hydrogen fluoride is present. Consequently, the process is to be performed at a temperature range of from about −20° C. to about 100° C., preferably from about 0° C. to about 50° C., and at an operating pressure sufficient to maintain liquid phase HF (i.e., from about 110 mmHg to about 8,000 mmHg). Typically a non-reactive or inert electrode as generally known in the art can be employed, preferably the electrodes are constructed of nickel or carbon.

In actual commercial practice, the reaction mixture will be distilled to obtain a high purity anhydrous hydrogen fluoride with low arsenic impurities. The distillation step can occur simultaneously (concurrently) or sequentially with the electrolysis step and can either involve a distillation column or a simple flash distillation unit as generally known in the art. Preferably, the distillation and/or the actual electrolysis will involve the use of an inert purge gas (as exemplified later) or sweep gas to remove any hydrogen co-product produced by virtue of the reduction reaction occurring at the cathode. Although the method according to the present invention is directed primarily to production of high purity anhydrous hydrogen fluoride containing low levels of arsenic impurity, it may also be used for the production of extremely high purity hydrogen fluoride for critical uses such as those required by the electronics industry.

The actual electrolysis cell and specifically the electrode configuration useful in the present invention can be any such device as generally known in the art including by way of example but not limited thereto; a conventional flat plate design or an extended surface electrode design such as disclosed in U.S. Pat. No. 3,859,195.

The following examples are presented to further illustrate specific embodiments of the present invention and in particular the effectiveness of using electrolysis, with or without an electrolyte, to remove trivalent arsenic impurities from anhydrous hydrogen fluoride. In these examples an electrolytic cell was used which consisted of a cylindrical polyethylene vessel (3.5 inches in diameter and 3.5 inches in height) with a "TEFLON" cap, of approximately 250 ml maximum working capacity. Extending through the cap were cathode and anode electrode leads that terminated internally to the cell in a series of parallel square nickle plates having an effective surface area of 171 square centimeters. The cap of the cell was also provided with valved hydrogen fluoride inlet line, a nitrogen sweep gas inlet port, a reflux condenser outlet port and a thermocouple well. The electrolytic cell was placed in a liquid bath for cooling, and a reflux condenser at −10° to −20° C. along with 100 cc/min. flow of nitrogen was used to minimize losses and to isolate the cell from atmospheric moisture. A Hewlett-Packard Model 6024 Auto-ranging DC power supply unit was used to produce the required current. Volt and amp meters were connected to measure voltage and current consumption, respectively. The nitrogen sweep gas exiting the top of the condenser was directed to a potassium hydroxide scrubber. The examples used anhydrous hydrogen fluoride of at least 99.7% HF content manufactured from fluorspar containing between 100 and 300 parts per million of arsenic. The resultant hydrogen fluoride used was stated by the supplier as having the following nominal analytical values: 99.9478% HF; 14 ppm $SO_2$; 9 ppm NVA; 18 ppm $H_2O$; 12 ppm $H_2SiF_6$ and 469 ppm As. Separate analysis of the AHF confirmed an arsenic content of 440 ppm. At the end of the electrolysis, the coolant flow to the reflux condenser was shut off, and vapor samples were collected for final arsenic analysis. All references to percentages and parts are by weight based on 100% HF unless otherwise specified.

EXAMPLE 1

The 250 ml electrolytic cell equipped with nickel electrodes was charged with 200 gm of anhydrous hydrogen fluoride containing 440 ppm of trivalent arsenic as an impurity. The condenser refluxing the vapors over the electrolytic cell was kept at −10° C. One gram of potassium fluoride (KF) was charged to the cell. The initial temperature of the electrolytic cell was 4° C. which increased to 10° C. by the end of the run. A direct current power supply was set up to deliver up to 6.5 volts and a maximum of 10 amperes to the electrodes. The maximum voltage obtained during the electrolysis was 5.5 volts, and the current flow became limiting at 9.9 amperes. This power was shut off after 20 minutes. Samples of the overhead contained 7.7 ppm of trivalent arsenic, a 98% reduction in arsenic impurity.

EXAMPLE 2

In a manner analogous to Example 1, the 250 ml electrolytic cell was initially charged with 230 gm of anhydrous hydrogen fluoride containing 440 ppm of trivalent arsenic impurity, and the cell was cooled to −3° C. No electrolyte was added. The power controls were again set to 6.5 volts and a maximum of 10 amperes. Power was applied to the electrodes for 12.5 minutes. Voltage was maintained between 6.2 and 6.5 volts. The amperage increased up to 2.3 amps as the power was activated and steadily dropped to 0.6 amps by the end of the run. Samples of the overhead contained 31 ppm of trivalent arsenic.

Due to liquid level loss in the cell, an additional 90 gm of similar anhydrous hydrogen fluoride was then charged to the electrolytic cell and the power was turned on for an additional 8 minutes. The amperage remained between 1.1 and 1.3, while the voltage was constant at 6.5 volts. Samples of the overhead contained 26 ppm of trivalent arsenic. Power was shut off for 15 minutes. Power was turned back on for an additional 10 minutes, maintaining the voltage at 6.5 volts. The amperage fluctuated from 1.1 amps at the moment power was re-established and slowly dropped to 0.9 amps by the end of the 10-minute run. Samples of the overhead contained 17 ppm of trivalent arsenic.

Due to liquid level loss in the cell, an additional 76 grams of similar anhydrous hydrogen fluoride was charged to the electrolytic cell, and the power was turned back on for a 16-minute period. The amperage climbed to 1.4 amps at the moment the power was re-established but, in less than one minute, the amperage was below 1.0 amps. During the remaining 15 minutes the amperage dropped steadily to 0.6 amps by the end of the run. Samples of the overhead contained 21 ppm of trivalent arsenic.

The anhydrous hydrogen fluoride remaining in the cell was evaporated and samples of the overhead and bottoms were analyzed for trivalent arsenic. After ⅓ of the liquid in the cell was evaporated, samples of the overhead contained 11 ppm of trivalent arsenic. The residue contained 604 ppm of pentavalent arsenic.

After ⅔ of the liquid in the cell was evaporated, samples of the overhead contained 11 ppm of trivalent arsenic. The residue then contained 865 ppm of pentavalent arsenic. The resulting data associated with the sequential runs of this example are presented in Table I.

TABLE I

Electrolytic Oxidation of Trivalent Arsenic in Liquid HF

| Run No. | Time Min. | HF* Added | Voltage | Amps | Watts | Average Coulombs/ Min | As** ppm |
|---|---|---|---|---|---|---|---|
| 1 | 12.5 | 200 | 6.5 | 2.3–0.6 | 15.1–4.5 | 66 | 31 |
| 2 | 8.0 | 90 | 6.5 | 1.3–1.2 | 8.7–7.6 | 72 | 26 |
| 3 | 10.0 | 0 | 6.5 | 1.1–0.8 | 7.4–5.4 | 60 | 17 |
| 4 | 16.0 | 76 | 6.5 | 1.4–0.6 | 9.6–4.1 | 50 | 21 |

*440 ppm of trivalent As
**volatile

EXAMPLE 3

Again in a manner analogous to the previous examples, a total of 248 gm of anhydrous hydrogen fluoride containing 440 ppm of arsenic impurity was charged to the electrolytic cell. The power controls were set to a maximum of 6.5 volts and 10.0 amperes. Power was applied to the cell 5 times for a period of 4 to 5 minutes each time with intervals of 8 to 11 minutes in between. Resulting data are shown on Table II.

TABLE II

Rate of Electrolytic Oxidation of Trivalent Arsenic In Liquid HF

| Cumulative Running Time (Minutes) | Cumulative Coulombs | Arsenic in Overhead ppm | Arsenic in residue ppm |
|---|---|---|---|
| 0 | 0 | 440 | 440 |
| 8.5 | 672 | 261 | 444 |
| 13.5 | 1238 | 184 | 453 |
| 19.0 | 1827 | 158 | 434 |
| 25.5 | 2423 | 30 | 428 |
| 33.5 | 3027 | 8 | 422 |

EXAMPLE 4

The 250 ml batch electrolytic cell equipped with nickle electrodes used in the previous examples was filled with 249.0 grams of anhydrous hydrogen fluoride which contained 329 ppm trivalent arsenic impurity. The overhead vapor condenser was set to 0° C. The cell was placed in a water bath for cooling. The initial temperature of the anhydrous hydrogen fluoride was 21.4° C., which increased to 22.6° C. during the run. A direct current supply was set to deliver 2.6 volts to the electrodes. The current flow started at 0.57 amps and fell to 0.02 amps at the end of the run. There were 74 coulombs put into the cell during this time. Samples of the overhead vapor contained 218 ppm of trivalent arsenic, a 34% reduction.

EXAMPLE 5

In a manner analogous to the previous examples, the 250 ml electrolysis cell equipped with nickle electrodes was filled with anhydrous hydrogen fluoride containing trivalent arsenic impurity. While 1,000 coulombs of d.c. current at 5.5 volts were passed through the electrolysis cell containing liquid hydrogen fluoride, the purge gas from the reactor was swept through 1,000 ml of an iodide containing solution. The resulting solution was then analyzed for iodine as evidence for the generation of elemental fluorine. The arsenic content of the HF was such that about 200 coulombs would be required to oxidize the trivalent arsenic to the pentavalent state. Consequently, approximately 800 coulombs were available to oxidize fluoride to fluorine (i.e., 0.0083 equivalents). The total iodine found (which corresponds to the maximum amount of fluorine which might have been present) was 0.0009 equivalents. Thus, no more than about 10% of the amount of fluorine which could have been generated was found. In view of the absolute quantities being measured, it is felt that the iodine could possibly be accounted for by atmospheric oxidation and certainly no substantial production of elemental fluorine is occurring.

Having thus described and exemplified the invention with a certain degree of particularity, it is to be understood that such details are solely for the purpose of illustration, and that many variations can be made without departing from the spirit and scope of the invention. Thus the following claims are not to be interpreted as being unduly limited, but are to be afforded a scope commensurate with the wording of each element of the claims and equivalents thereto.

What is claimed is:

1. A process for purifying anhydrous hydrogen fluoride comprising the steps of:
    (a) passing an effective amount of direct current through anhydrous hydrogen fluoride containing trivalent arsenic impurities to oxidize substantially all of said trivalent arsenic to pentavalent arsenic; and
    (b) distilling the resulting mixture, thus isolating and separating a residue enriched in arsenic impurities while simultaneously recovering anhydrous hydrogen fluoride distillate with reduced levels of arsenic impurities.

2. The process of claim 1 further comprising the step of adding of a non-oxidizable electrolyte to said anhydrous hydrogen fluoride containing trivalent arsenic impurities.

3. The process of claims 1 or 2 wherein the temperature is about −20° C. to about 100° C.

4. The process of claims 1 or 2 wherein the temperature is about 0° C. to about 50° C.

5. The process of claim 1 or 2 wherein the voltage associated with said direct current is between about 0.85 and about 10 volts.

6. The process of claim 1 or 2 wherein the voltage associated with said direct current is between about 0.85 and about 9.5 volts.

7. The process of claim 1 or 2 wherein the voltage associated with said direct current is between about 0.85 and about 3.2 volts.

8. The process of claim 1 or 2 wherein the voltage associated with said direct currents is between about 3.25 and about 7.5 volts.

9. The process of claims 1 or 2 wherein the operating pressure is from about 110 mmHg to about 8,000 mmHg.

10. The process of claims 1 or 2 wherein said passing of direct current is by electrodes constructed of nickel or carbon.

11. The process of claim 10 wherein the anode electrode is nickel.

12. The process in claims 1, or 2 wherein a sulfur containing compound is present as an impurity.

13. The process of claims 1, or 2 wherein a phosphorous containing compound is present as an impurity.

14. The process of claims 1, or 2 wherein water is present as an impurity.

15. A process for purifying anhydrous hydrogen fluoride comprising the steps of:
   (a) passing a direct current at a voltage from about 0.85 volts to about 10 volts through anhydrous hydrogen fluoride containing at least one impurity selected from the group consisting of arsenic containing compounds, phosphorous containing compounds, sulfur containing compounds and water; and
   (b) distilling the resulting mixture, thus isolating and separating a residue enriched in arsenic impurities while simultaneously recovering anhydrous hydrogen fluoride distillate with a reduced level of arsenic impurity.

16. The process of claim 15 wherein the voltage is from about 0.85 volts to about 9.5 volts.

17. The process of claim 15 wherein the voltage is from about 0.85 volts to about 3.25 volts.

18. The process of claim 15 wherein the voltage is from about 3.25 volts to about 7.5 volts.

19. A method for purifying anhydrous hydrogen fluoride comprising the steps of:
   (a) electrolytically oxidizing an impurity comprising a volatile arsenic compound, within liquid anhydrous hydrogen fluoride, to a non-volatile arsenic compound, without the addition of oxidizing chemicals, and;
   (b) distilling the resultant mixture, thus recovering anhydrous hydrogen fluoride with reduced levels of impurities.

20. The process of claim 19 wherein said electrolytically oxidizing further comprises employing a series of electrolytic cells, and; passing the anhydrous hydrogen fluoride through the electrolytic cells.

* * * * *